No. 720,266. PATENTED FEB. 10, 1903.
A. C. LINDGREN.
LISTER CULTIVATOR.
APPLICATION FILED OCT. 7, 1902.
NO MODEL. 3 SHEETS—SHEET 3.
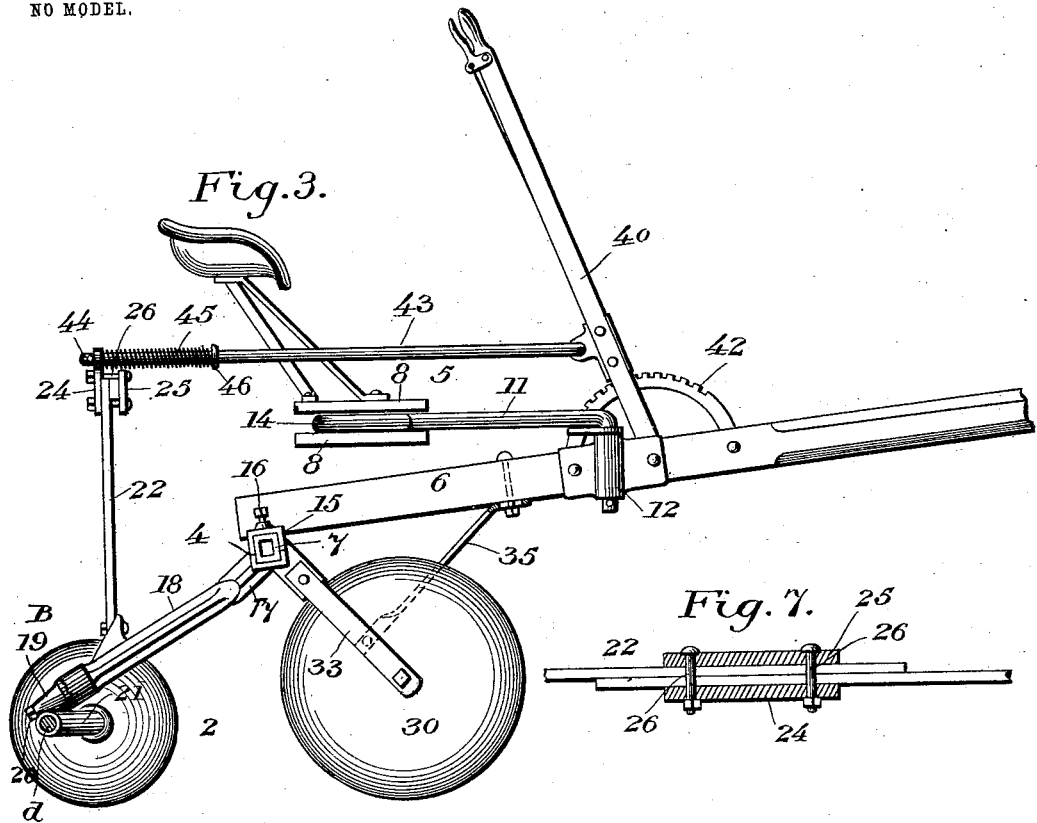
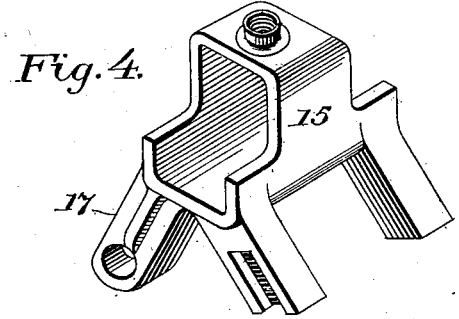
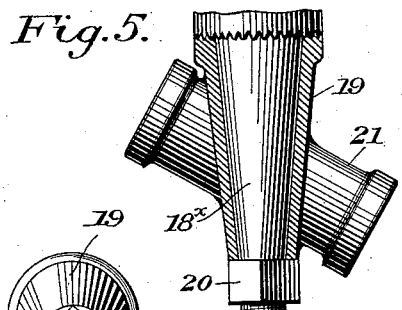
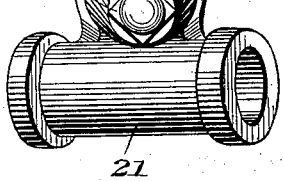
Witnesses.
Inventor.
A. C. Lindgren
By P. T. Dodge
Atty.

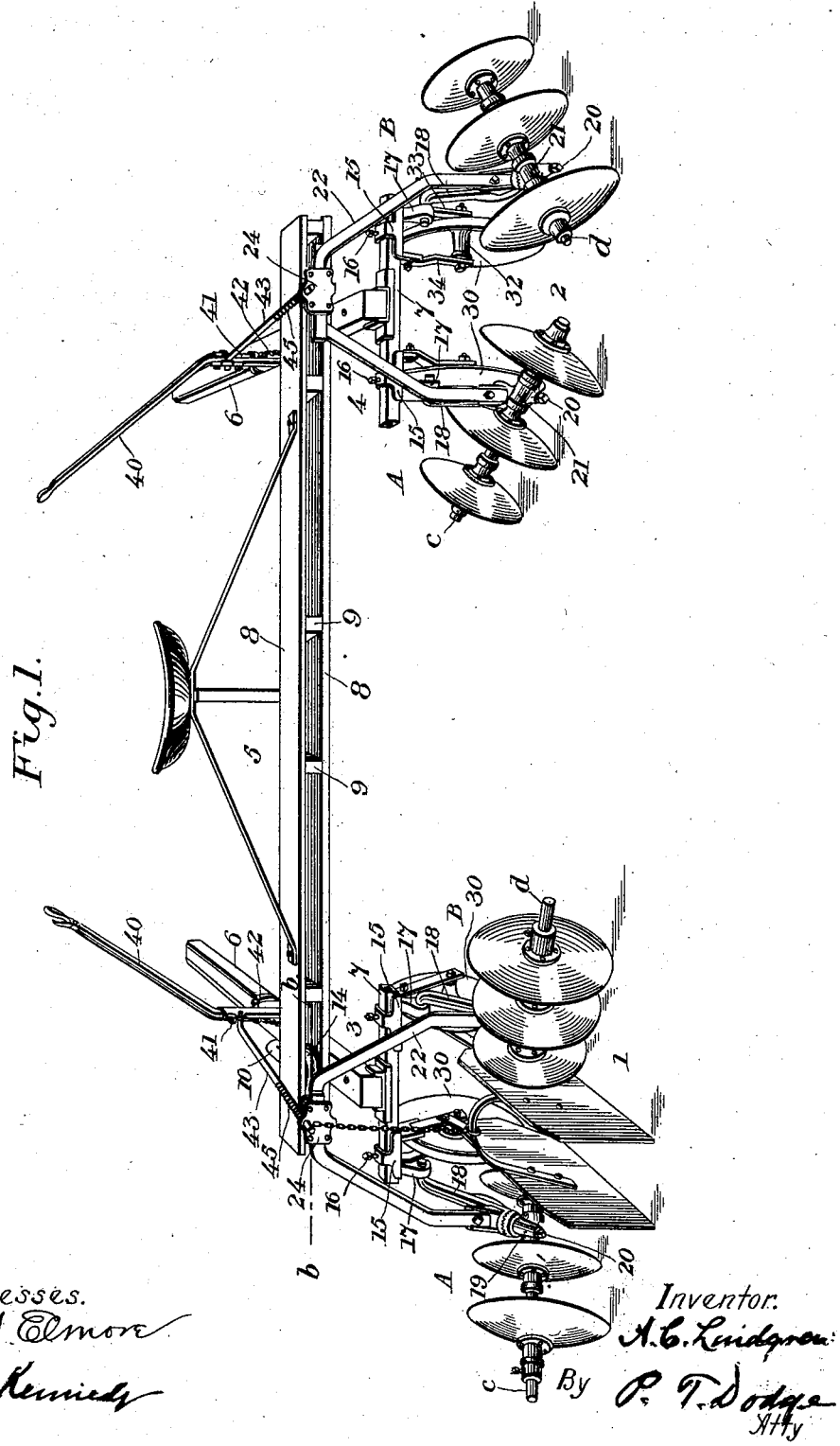

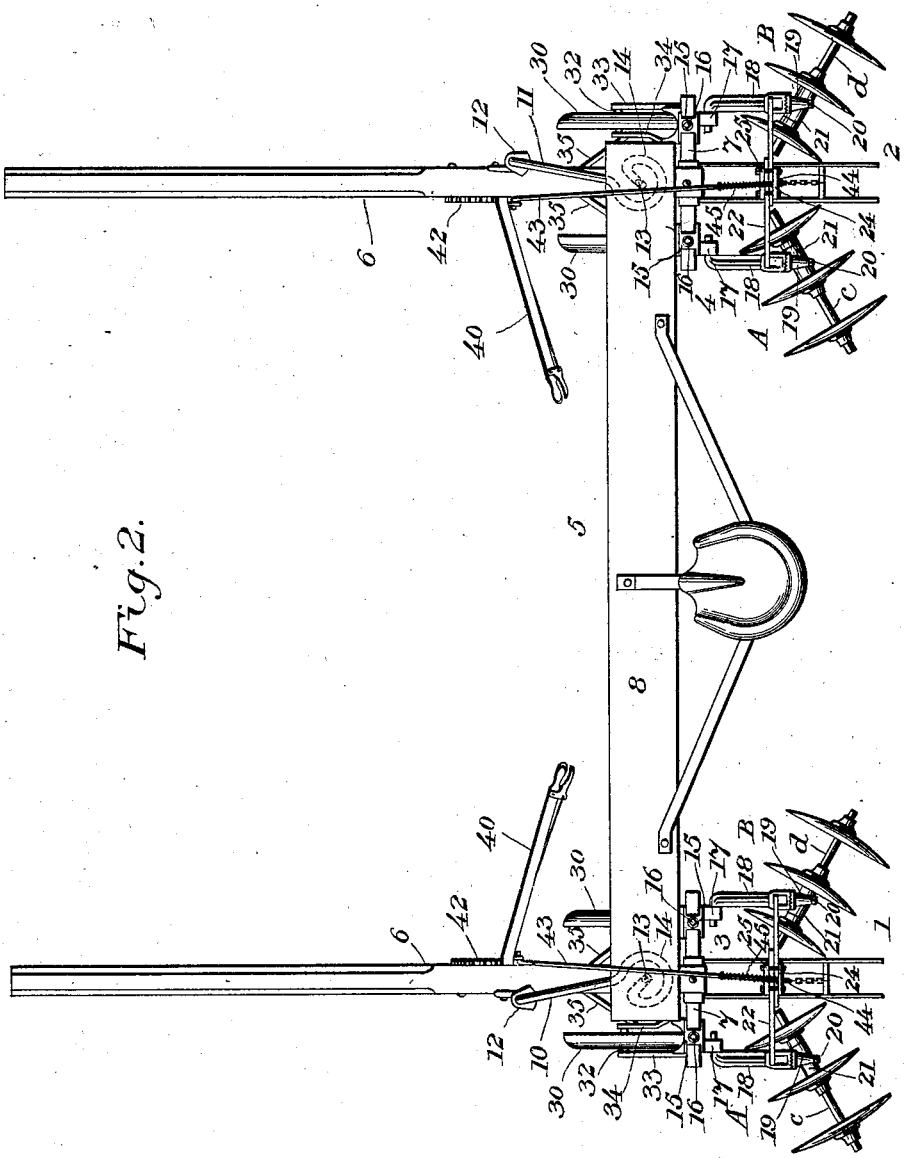

UNITED STATES PATENT OFFICE.

ALEXUS C. LINDGREN, OF MOLINE, ILLINOIS, ASSIGNOR TO THE MOLINE PLOW COMPANY, A CORPORATION OF ILLINOIS.

LISTER-CULTIVATOR.

SPECIFICATION forming part of Letters Patent No. 720,266, dated February 10, 1903.

Application filed October 7, 1902. Serial No. 126,275. (No model.)

*To all whom it may concern:*

Be it known that I, ALEXUS C. LINDGREN, of Moline, county of Rock Island, and State of Illinois, have invented a new and useful Improvement in Lister-Cultivators, of which the following is a specification.

This invention relates to cultivators of the type used in working listed corn; and the invention has reference more particularly to what are known in the art as "two-row" machines—that is, machines designed to work two rows of corn at once—and embodying usually two flexibly-connected frames formed each to straddle a row of the plants and equipped with appropriate cultivating-tools which act at the sides of the rows.

In the machine embodying my present invention the cultivating devices are in the form of disk gangs; and the invention consists of various improvements directed more particularly to the construction of the frames which carry the disks, the manner of connecting these frames so that they may conform to inequalities in the distance between the rows of plants, to the manner of sustaining and adjusting the disk gangs and other parts, and to various other features of construction, which will be fully described hereinafter and pointed out in the claims.

In the accompanying drawings, Figure 1 is a rear perspective view of my improved machine. Fig. 2 is a top plan view of the machine. Fig. 3 is a central longitudinal sectional elevation through one of the draft-frames and adjacent parts. Fig. 4 is a perspective view of one of the sleeves or castings with which the disk gangs and guide-wheels are connected. Fig. 5 is a plan view, partly in section, of one of the bearings or supports for the disk gang. Fig. 6 is an end elevation of the same. Fig. 7 is a longitudinal section on the line b b of Fig. 1, showing how the parts of the arch which connect opposite gangs are adjusted.

Referring to the drawings, my machine embodies two sets of disk gangs 1 and 2, each set composed of a gang A and a gang B, each in the presence instance having three disks mounted on shafts c d and arranged to act at the opposite sides of a row of plants. These gangs are connected with draft-frames 3 and 4, which latter are joined by a transverse seat-bar 5 in a manner presently to be described. The draft-frames 3 and 4 in the present instance each consists of a tongue 6 and a transverse bar 7, firmly fixed to its rear end and preferably formed of a section of square tubing. The seat-bar 5 extends transversely from one tongue to the other and consists of two planks 8, spaced apart by cleats 9 and jointed to the tongues by means of fore-and-aft links 10 and 11, pivoted, respectively, to the tongues and to the seat-bar near the ends of the latter. The forward ends of these links are turned down at right angles and seated loosely in bearings 12 on the sides of the tongues, while their rear ends are pivoted between the planks of the seat-bar on vertical axes 13, and they have a flat extended bearing-surface engaging the adjacent faces of the planks, which bearing-surface is formed, preferably, by bending the rear ends of the links where they extend between the planks in the form of a circular frame 14. The purpose of providing these wide bearing-surfaces where the links are connected with the seat-bar is to prevent the frame from tipping over, which would be apt to occur if the links were extended straight back to their point of pivotal connection with the seat-bar. This manner of connecting the seat-bar with the two draft-frames permits them to move to and from each other and relatively to each other in a horizontal direction, so as to readily conform to irregularities in the distance between the rows of plants, and a reasonable degree of vertical play between the parts is allowed by leaving a slight space between the extended bearing-surfaces of the link and the two planks of the seat-bar.

Referring now to the manner of connecting the disk gangs with the draft-frames, as the constructions on both sides of the machine are identical a description of one will suffice.

The ends of the cross-bar 7 are encircled by castings or sleeves 15, arranged on opposite sides of the tongue and adjustable along the bar by means of clamping-screws 16. Extending rearwardly from each sleeve is a lug 17, provided with an opening in which are mounted the upper forward ends of draft-arms 18 in such manner that the arms will have a loose bearing in the lugs and can turn therein on a horizontal transverse axis. The lower ends of the draft-arms are each formed with a rearwardly-extending trunnion 18×, Fig. 5, on which is mounted a sleeve 19, confined by a nut 20, screwed on the end of the trunnion, the construction being such that by loosening this nut the sleeve may be turned around on the trunnion, so as to reverse its position thereon end for end. The sleeve is formed with a transverse extension 21, having a bearing therethrough in which is mounted the shaft of the disk gang, so that the gangs sustained by the sleeves will be disposed end to end, as shown in Fig. 1. The transverse extension 21 is not arranged at right angles to the sleeve, but at an inclination or obliquely with respect to the same. Hence the two disk gangs will also extend at an inclination with respect to each other, so as to work the soil toward the row of plants, as shown in Fig. 1. This inclination of the gangs may be by the construction described reversed to throw the soil outward, as shown to the right in Fig. 1, which is accomplished by adjusting the sleeves around their trunnions end for end, which action will reverse the obliquity of the two bearings.

The draft-arms 18 are connected by an arch-frame 22, Fig. 3, in the form of two flat bars, with their lower ends firmly bolted to the respective draft-arms and their upper ends extending horizontally and overlapping and held firmly between clamping-plates 24 and 25, suitably connected by clamping-bolts 26. By loosening these plates the two members of the arch may be moved one on the other, so as to conform to the adjustments of the gangs through the sleeves 15 on the crossbar 7. It is frequently demanded in practice that the distance between the gangs be changed, for in the first working of the plants it is customary to set the gangs closer together, as shown to the right in Fig. 1, than in the subsequent working, when the gangs are set farther apart, as shown to the left in said figure.

In connection with the disk gangs adjustably mounted as described I propose to employ ground or guide wheels 30, which are arranged one in front of each gang, so as to travel in advance of the same on the opposite sides of the plants. The purpose of these wheels is to travel close to and hug the banks of the rows and in this manner guide and steady the machine in its travel. The wheels are mounted in bearings 32 on the lower ends of arms 33 and 34, extending forwardly and downwardly on opposite sides from the sleeve 15, so that the wheels and their bearings are adjustable transversely with the sleeves, and consequently with the disk gangs connected with the sleeves. The bearings of these wheels have connected with them the lower ends of draft-rods 34, extending upwardly and forwardly to the under side of the tongue, where they are slotted to receive a fastening-bolt which firmly secures them to the tongue. It will be seen, therefore, that from the construction described when the sleeves 15 are adjusted to vary the distance between the gangs or the wheels both the gangs and the wheels will be moved together—that is to say, they will be adjusted simultaneously—and the formation of the arch of the two adjustable members admits of these adjustments of the other parts.

The sets of gangs are each adapted to be raised and lowered by means of hand-levers 40, each mounted on its tongue and provided with a spring-dog 41, engaging a toothed segment 42, fixed to the tongue. The lever has jointed to it the forward end of a link 43, whose rear end is passed loosely through a perforated ear on the clamping-plate of the arch, and the rod is formed on its end with a head 44 to engage the plate and lift the gangs when the lever is pushed forward. The link forward of the arch is encircled by a spiral spring 45, bearing at its front on a fixed washer 46 and at its rear against the arch, which spring holds the disks to their work with a yielding pressure, so that they may readily yield in encountering obstructions.

While I have described and illustrated the cultivating devices in the form of rotary disks, it will be understood that other devices of an equivalent nature may be employed, such as blades and the like.

Having thus described my invention, what I claim is—

1. In a lister-cultivator the combination with a plurality of cultivating-frames, of a transverse connecting-bar extending from one frame to the other, connecting devices jointed at their forward ends to the frames and at their rear ends to the bar and formed at their rear ends where they are jointed to the bar with flat extended bearing-surfaces arranged to have a bearing and to abut against the bar, and serving to prevent the frames from tipping.

2. In a lister-cultivator the combination with a plurality of cultivating-frames, of a transverse connecting-bar extending from one frame to the other, and fore-and-aft connecting-links jointed at their forward ends to the frames and having their rear ends coiled and jointed to the bar.

3. In a lister-cultivator the combination with a plurality of cultivating-frames, of a transverse connecting-bar, fore-and-aft links jointed at their forward ends to the frames on vertical axes, and having their opposite ends bent to form circular bearing-frames and jointed to the transverse bar.

4. In a lister-cultivator the combination with a plurality of frames, of a flat connecting-bar formed of superposed planks with a space between them, links jointed to the frames at their forward ends and provided at their rear ends with extended flat bearing-surfaces extending between the planks and jointed to the same.

5. In a lister-cultivator, the combination with a draft-frame, of disk gangs connected therewith and adjustable one with relation to the other transversely of the line of draft, and guide-wheels adjustable with said disks.

6. In a lister-cultivator the combination with a draft-frame, of sleeves adjustable to and from each other transversely of the line of travel, disk gangs connected with said sleeves, and guide-wheels sustained by the sleeves; whereby the wheels and disk gangs may be adjusted simultaneously.

7. In a lister-cultivator, the combination with the draft-frames, of draft-arms connected therewith at their forward ends and adjustable to and from each other, disk gangs carried by said arms at their opposite ends, and a connecting-arch for the gangs comprising two members having their lower ends firmly connected with the respective draft-arms at their rear ends, and their upper ends adjustably connected together.

8. In a lister-cultivator the combination with a draft-frame, of opposing sets of disk gangs jointed thereto to rise and fall, an arch connecting said gangs to cause them to move in unison, a lever on the frame, and a connection between the lever and the arch for elevating the disk gangs.

9. In a lister-cultivator the combination with a draft-frame, of opposing sets of disk gangs jointed thereto to rise and fall, an arch connecting said gangs and causing them to move in unison, a hand-lever mounted on the frame on a horizontal axis, a horizontal rod jointed at its forward end to the lever and extended rearward loosely through the arch and provided on its end with a head or stop, and a spring encircling the rod and bearing against the same and against the arch.

10. In a lister-cultivator the combination with a draft-frame provided with a horizontal bar 7, of sleeves mounted thereon and adjustable to and from each other, draft-arms 18 pivoted at the forward ends of the sleeves on horizontal axes, and disk gangs mounted on the rear ends of the arms.

11. In a lister-cultivator the combination with a draft-frame, of opposing sets of disk gangs mounted to rise and fall, an arch connecting said gangs and causing them to move in unison, and a spring acting on the arch and serving to depress the same with yielding pressure.

12. In a lister-cultivator, the combination with a draft-frame, of disk gangs carried thereby and adjustable to and from each other, guide-wheels adjustable with the gangs, and draft-rods connected at their rear ends with the bearings of said guide-wheels and having their opposite ends adjustably connected with the draft-frames.

13. In a lister-cultivator the combination with a draft-frame provided with a longitudinally-extending trunnion, of a sleeve mounted thereon and adjustable therearound, and a transverse extension 21 connected rigidly with the sleeve and formed with a shaft-bearing extending obliquely with reference to the axis of the sleeve, and in a plane parallel therewith.

In testimony whereof I hereunto set my hand, this 6th day of September, 1902, in the presence of two attesting witnesses.

ALEXUS C. LINDGREN.

Witnesses:
JNO. J. ROSS,
J. S. PATTON.